March 12, 1968 R. P. MOTTE ET AL 3,372,869
CALCULATOR
Filed June 13, 1966 2 Sheets-Sheet 1

INVENTOR.
René P. Motte
William Wraith III
Renato B. Cucchi

Attorneys

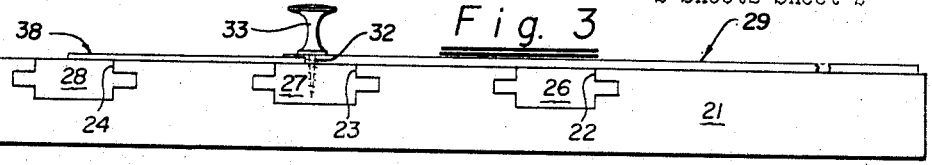
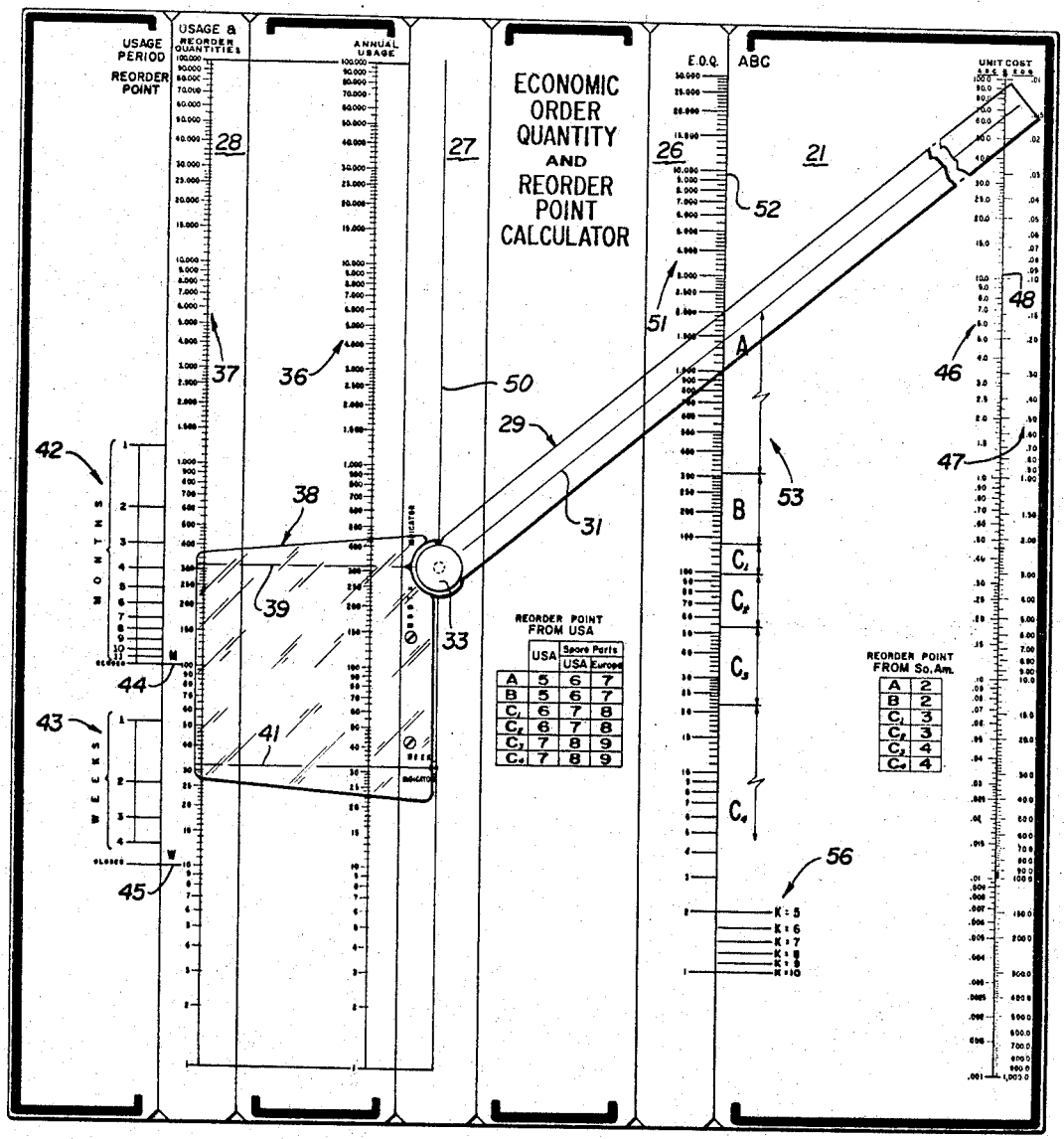
Fig. 2
INVENTOR.
René P. Motte
William Wraith III
Renato B. Cucchi
Attorneys

United States Patent Office 3,372,869
Patented Mar. 12, 1968

3,372,869
CALCULATOR
René P. Motte, William Wraith III, and Renato B. Cucchi, all of Apartado 1229, Lima, Peru
Filed June 13, 1966, Ser. No. 557,095
10 Claims. (Cl. 235—70)

ABSTRACT OF THE DISCLOSURE

A slide rule type calculator for finding economic order quantities including a base having a first and second spaced slide members disposed in slots formed therein and intersected by an isopleth member pivotally mounted to one of the slides. The calculator carries scales representing the annual useage values and reorder quantities, useage period and reorder points, economic order quantities and K values.

---

This invention relates generally to calculators, and particularly to calculators for use in inventory control or management.

Heretofore, inventory systems have been studied and managed using mathematical models of the inventory behavior of actual business operations. Such a model is mathematically described by an equation which relates the usage, cost and operating variables for each item of inventory to derive certain quantities called reorder quantites and economic order quantities which are related to the optimum behavior of the inventory system being studied and which derive when and how much to reorder. Heretofore, the relationships between the relevant variables have been assembled into a nomograph form known as the reorder quantity nomograph. For specific conditions, the nomograph is used to determine the optimum reorder point and economic order quantities. However, the nomograph has been limited in that it does not account for the behavior of actual inventory systems with respect to certain variables such as cost of ordering and cost of carrying an item; nor does it permit the use of usage or reorder point data arbitrarily broken down by month or week. There is, therefore, a need for a new and improved inventory control calculator.

In general, it is an object of the invention to provide a calculator for use in inventory control which will overcome the above named disadvantages.

Another object of the invention is to provide a calculator of the above character which is widely applicable to solve many types of inventory control problems.

Another object of the invention is to provide a calculator which will yield the economic order quantity and reorder point quantity rapidly without requiring time consuming multiplication or division by the user for each item.

Another object of the invention is to provide a calculator of the above character which eliminates the need to calculate annual usage as a separate number.

Another object of the invention is to provide a calculator of the above character which can be used to derive A, B, C, control categories and associated reorder points.

It is another object of the invention to provide a calculator of the above character which is designed on the nomograph principle, but with scales which are slidable relative to each other so that certain variable quantities may be taken into account.

It is a further general object to provide a calculator which is capable of solving equations of the general type $Q = K^m U^n / P^r$ where K, U, and P are variables and $m$, $n$ and $r$ are constants.

These and other objects of the invention will be apparent from the following description when taken in conjunction with the accompanying drawings.

Referring to the drawings:

FIGURE 2 is a plan view of an inventory control calculator constructed according to the invention.

FIGURE 3 is an end view of the inventory control calculator of FIGURE 2.

INVENTORY CONTROL THEORY

Figures 1, 4:
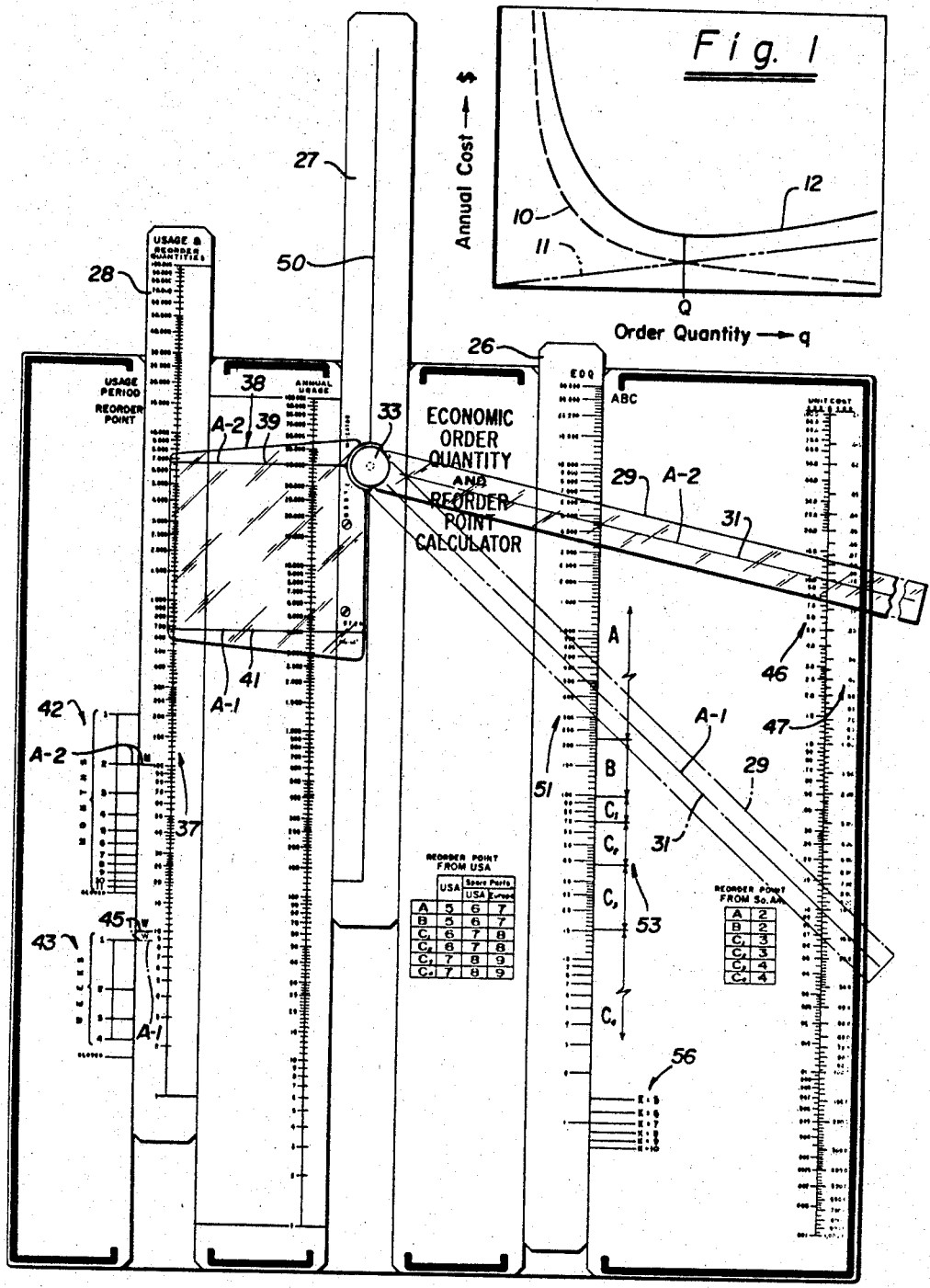
FIGURE 1 is a graph illustrating the relationship between annual inventory costs and the number of units per order.
FIGURE 4 shows the calculator of FIGURE 2 as used to solve a specific example of an inventory control problem.

In general, the problem of managing inventory for the simple case is solved by a model in which it is assumed that the total cost of managing inventory is the sum of two variable factors; one, the cost of ordering, and, two, the cost of carrying supplies in inventory. The quantity to be ordered which minimizes the total variable costs is called the economic order quantity.

The following definitions are used in this discussion:

$q$ is the quantity ordered at any one time,
Q is the most economical ordering quantity,
P is the unit price,
U is the annual usage,
C is the cost of ordering in dollars,
$i$ is the percentage of the unit cost for covering the cost of carrying an item in inventory stock.

The ordering cost is a function of the quantity ordered and obviously decreases as the order quantity increases. Thus, a specific cost per order is spread over more units. The annual ordering costs are therefore just the cost of ordering the item C times the annual usage U divided by the quantity order $q$, or expressed as an equation total annual ordering costs equal $CU/q$.

The carrying costs relate to the cost of carrying the physical inventory on hand plus the cost of the money tied up in the inventory. The first is usually expressed as a percentage $i$ of the unit purchase cost of the item in a relation to a certain period of time, such as so much percent per year, times the unit cost of the item P. Thus, P times $i$ is the annual cost per unit carrying the same in inventory. Since inventory decreases at a relatively constant rate from some particular order quantity to zero, before being replenished, the average carrying cost is $Pi/2$. This is multiplied times $q$, the quantity ordered, to derive the total carrying cost per year.

Thus, the total annual ordering and carrying costs are $$\frac{CU}{q} + \frac{Piq}{2} = T \qquad (1)$$

FIGURE 1 shows a plot of carrying costs 10, ordering costs 11 and total costs 12 with respect to ordering quantity $q$. It is seen that at low ordering quantities, the ordering cost factor predominates and causes total annual costs to become excessive, while at higher ordering quantities the carrying costs predominate. In between, there is an ordering quantity Q at which the total costs are at a minimum. This value of $q$ is commonly called the economic order quantity Q and is found by differentiating the expression (1) with respect to $q$ and setting the differential $dT/dq=0$.

$$\frac{dT}{dq} = -\frac{CU}{q^2} + \frac{Pi}{2} \quad (2)$$

$$\frac{dT}{dq}\bigg|_Q = 0$$

$$Q^2 = \frac{2CU}{ip} \quad (3)$$

$$Q^2 = \left(\frac{2C}{i}\right)\left(\frac{U}{P}\right) \quad (4)$$

$$Q = K\left(\frac{U}{P}\right)^{1/2} \quad (5)$$

where K is a constant relating fixed value to ordering costs and inventory carrying percentages.

This formula requires that square root of the annual usage be divided by the square root of the unit cost and that the result be multiplied by K, a constant, to yield the economic order quantity Q. Q represents the order quantity at which the total costs are at a minimum, and at which the change in cost with respect to change in order quantity is minimum. For ranges of P from $0.01 to $1800.00, and U from 1 to 100,000, Q is seen to vary from about 1 to 30,000 when K lies between about 5 to 10.

The calculation of the appropriate K factor for any company situation depends upon its cost of ordering an item C, and their estimated costs of carrying inventories I expressed as a decimal. A typical cost of ordering is $6.00 in U.S. industry today. A typical cost of carrying inventories is 20% of the average inventory value. On this basis, the K factor would be calculated as follows:

$$K\sqrt{\frac{2C}{I}}$$

$$K\sqrt{\frac{(2)(\$6)}{(20\%)}}$$

$$K - 7.7 \text{ or } 8$$

a typical and generally applicable K factor for U.S. industry. Generally K varies from a low of about 5 to a high of about 10.

ABC INVENTORY CONTROL AND SAFETY STOCK THEORY

It is common, in industry today, for companies to classify their inventory items, in some order of importance. Several forward-looking companies have categorized their inventory items into A, B, and C categories, with varying degrees of control exercised over the items in each of these categories. These categories are typically determined as follows:

A items

These are the small percentage (5–10%) of items in inventory which account for the majority (70–80%) of annual dollar usage. Typically these are items of over $1000.00 total annual usage. Tight controls are established for these items (including minimum safety stocks and minimum ordering quantities), in order to minimize inventory investment.

B items

These are inventory items of intermediate importance. They account for about 10–20% of the items and about 10.20% of the total dollar usage. Typically, annual usage of these items varies between $200.00–$999.00.

C items

These are the numerous, comparatively unimportant inventory items. They account for about 75–85% of the items, but for only about 5–10% of annual dollar usage. Annual usage of these items is typically under $200.00.

Ordering quantities and safety stocks for these lower value items are set at comparatively higher levels, in order to provide a large "safety margin" or protection against stockouts. This minimizes management and clerical effort required to control the large majority of inventory items.

The general "ABC" control theory is best illustrated with the following specific example, based on a lead time of one month for all items ordered.

TABLE I

| Class | Reorder Points in Months |
|---|---|
| A | 2 |
| B | 2 |
| C1 | 3 |
| C2 | 3 |
| C3 | 4 |
| C4 | 4 |

Table I is also reproduced in the drawings, as well as Table II, based on longer lead lines.

In order to be able to use Table I above, one must know whether an item is an A, B, C1, C2, C3, or C4 item which requires a calculation multiplying annual usage and unit price.

CALCULATOR

Referring now to FIGURES 2 and 3, there is shown a calculator incorporating the above ranges of P, U, and K, and capable of deriving reorder and economic order quantities. The calculator comprises a base 21 having spaced parallel slots 22, 23, 24 adapted to receive elongate members or slides 26, 27, 28 therein for sliding movement with respect to the base. Slide 27 carries a straight elongate member 29 having an isopleth 31 marked on its lower surface. The member 29 is constructed of clear plastic so that the indicia laid out on the base and slides are clearly visible through it. Member 29 is pivotally affixed to slide 27 by a post 32 screwed into the slide. Post 32 has a knob 33 thereon which serves as convenient means for moving one end of member 29 and slide 27 together as a unit.

An annual usage or U scale 36 is printed on base 21 between slide 27 and slide 28 and is in parallel alignment with slide 27. Scale 36 is subdivided into logarithmic increments ranging in value from 1 to 100,000 units used per year.

A usage and recorder quantity scale 37 is printed on slide 28, scale 37 being identical to scale 36 and running in the same sense, i.e., it increases in the same direction as scale 36. Slide 27 carries a cursor 38 which is marked with a hairline 39 for indicating month readings and is further marked with a hairline 41 for indicating week readings. Hairline 39 is arranged so that it intersects the pivot point of isopleth member 29. Hairlines 39 and 41 are perpendicular to scales 36, 37 and also to the direction of movement of slide 27, and they are spaced from each other a distance equivalent to a division of units on scale 36 of about a factor of 10 for reasons to be hereinafter described. Cursor 38 and hairlines 39 and 41 span both of scales 36, 37, so that the scales can be read as though they were juxtaposed. Thus relative displacement between scales 36, 37, as by motion of slide 28, corresponds to a multiplication or division, and values on scale 37 are transferred into scale 36 by use of the appropriate hairline 39 or 41.

Usage and reorder point scales 42 and 43 are printed on base 21 adjacent slide 28. Scale 42 indicates months, and scale 43 indicates weeks. Each of the scales is logarithmically divided into increments of the same size as scales 36, 37 but reversed in direction. Scale 42 is termed a month scale since adjustment of slide 28 to bring the M mark 44 in alignment with any number on scale 42 serves to multiply the number appearing in scale 37 by the number appearing in scale 42, the answer appearing at the intersection of hairline 39 on annual usage scale 36. Therefore, data of the form X units
Y months is quickly converted into annual usage values by setting the Y to scale 42 using mark 44 and by setting the X into scale 37 using the hairline 39, the annual usage being indicated by the coincidence of hairline 39 on scale 36. Furthermore, isopleth member 29 is thereby brought to the correct annual usage value which will be used in the remaining calculations to be hereinafter described.

Scale 43 is termed a week scale and operates in a similar manner to scale 42, that is to say, adjustment of slide 28 to bring mark 45 adjacent one of the values on scale 43 serves to multiply any number on scale 37 such that data of the form X units
Z weeks is converted into annual usage values by setting the Z into scale 43 using mark 45, and by setting X into scale 37 using hairline 41. The annual usage is found at the coincidence of scale 36 and hairline 39.

By way of summary, then, the annual usage values are readily calculated from either monthly usage or weekly usage data, and the result is indicated by the position of slide 27 with respect to scale 36. The values of scale 36 effectively lie along line 50, which line represents the line of travel of pivot 32, and, therefore, defines one point of the position of isopleth 31 on member 29.

An ABC unit cost scale 46 and an economic order quantity unit cost scale 47 are printed along a common line 48 which runs parallel to slides 26 and 27, on base 21, and which lies on the opposite side of slide 26 from slide 27. Scales 46 and 47 are logarithmically divided into increments running from .001 of a cent to $100.00, and are reversed with respect to one another in such a manner that scale 46 runs in the same sense as the annual usage scale 36, and scale 47 runs in the opposite sense. An economic order quantity scale 51 is printed on slide 26 and is arranged to be read along a line 52 defined by a common edge between slide 26 and slot 22. Scale 51 is logarithmically divided into increments representing units from 1 unit to 30,000 units. An ABC category scale 53 is printed on base 21 adjacent line 52, and is subdivided into increments such that a correspond to annual usage in dollars in excess of $1000.00, B corresponds to annual usage in dollars between 200 and 999, and C represents annual usage in dollars under 200. C may be further broken down, if desired.

Base 21 is provided with a K value scale 56 which is logarithmically divided into increments running in the opposite sense from the annual usage scale, and ranging in value from 5 to 10. Since scale 51 on slide 26 is adjustable with respect to scale 36 and scale 47, the position of slide 26 determines values of K corresponding to the factor previously discussed.

Scale 56 enables the user to set E.O.Q. scale for any factor of K which is appropriate for his own company's costs of ordering and carrying inventory. Thus, the calculator has general application for any company or organization. If the user has difficulty determining his actual costs, then he would be quite safe, in the interim, to proceed with using the K factor of 8.

The annual usage scale 36, the economic order quantity scale 51, and the unit cost scales 46 and 47 are seen to be effectively represented along the lines 50, 52 and 48, respectively. These lines are constructed to be equally spaced and parallel with respect to each other so that the scales form a nomograph which satisfies equation $$Q^2 = K^2 \frac{U}{P}.$$

To solve this equation, it is preferred to arrange all scales logarithmically with the same repeat or cycle length. The effective separation of scales 36, 47 and 51 is preferably the same, scales 36 and 51 increasing in one direction and scale 47 increasing in the opposite direction. Scales 36 and 47 are reversed to accomplish the division required, while scale 51 has the same cycle length to thereby solve the square root. Scale 56 is also reverse oriented from scale 51 and adjusted for cooperating therewith in performing a multiplication of K times scale 51 when the "1" on scale 51 is aligned adjacent the appropriate K value in scale 56.

OPERATION

In general, the calculator is operated as follows: Assume the usage during one week is known, then annual usage can be calculated directly by moving the W marker 45, on slide 28, to a point opposite the "1 WEEK" line on the scale 43, then moving hairline 41 to a point opposite the units of weekly usage on scale 37. Annual usage is then read off directly from the intersection of hairline 39 on scale 36.

The appropriate ABC control classification is determined by simply rotating isopleth member 29 (already set to the units of annual usage) to the unit price on the scale 46. The appropriate ABC classification being determined directly from the point at which the line crosses line 52 across the divisions marked A, B, $C_n$ on scale 53. The ABC classificaton is then used to derive the appropriate reorder point in Tables I, or II.

Then, the reorder point in months is set by aligning marker 44 to the appropriate reorder point on scale 42, the reorder quantity appearing at the intersection of hairline 39 with scale 37.

The economic order quantity is found by aligning the "1" value of scale 51 with the appropriate K value in scale 56. Isopleth member 29 is then rotated to intersect the appropriate unit cost on scale 47, the economic order quantity being indicated at the intersection of isopleth 31 across scale 51.

EXAMPLE

The following example illustrates the use of the calculator in deriving reorder quantities and economic order quantities from the following data. The positions of the various parts of the calculator during the calculation is shown in FIGURE 4.

(1) Weekly usage, 770. K, 7. Unit price, $0.10. Item to be ordered from South America, i.e., use Table I.

(2) First calculation (indicated in broken lines in FIGURE 4). Set E.O.Q. scale at K=7. This value represents the cost of ordering and carrying inventory.

Set the other scales to positions labeled A–1, as follows:

SCALE SETTINGS

| "Weeks" Scale | "Weeks Indicator" Scale | "Unit Cost-ABC" Scale |
|---|---|---|
| Line up "1" on "Weeks" scale 43 with marker 45 on slide 28. | Line up lower line 41 on marked "Weeks Indicator", with weekly usage of 770 on Scale 37. | Rotate member 29 arm until it crosses the Scale 46 at a unit cost of $0.10. |

READ SOLUTION

| Control Classification | Reorder Point Table |
|---|---|
| Read classification "A" at intersection of isopleth member 29 and scale 53. | Select reorder point corresponding to A item, 2 months supply, when ordered from South America as set forth in Table I. |

(3) Second calculation (indicated at full lines on FIGURE 4).
Set scales to positions labeled A–2, as follows:

| Scale Settings | | Read Solution | |
| --- | --- | --- | --- |
| "Months" Scale | "Unit Cost, E.O.Q." Scale | "Reorder Point" Scale | "E.O.Q." Scale |
| Line up "2" on "Months" scale 42 with marker 44 on slide 28. | Rotate member 29 until it crosses the scale 47 at unit cost of $0.10. | Read reorder point quantity at intersection of scale 37 and line 39, 6,700 units. | Read most economical ordering quantity at intersection of isopleth member 29 and scale 51, 4,400 units. |

(4) Third calculation. When the above calculations are completed, calculate quantity to be reordered, by making two simple additions and one subtraction, as follows:

| Addition or Subtraction | Answer | Source of Data |
| --- | --- | --- |
| Quantity on hand | 5,300 | Other. |
| Quantity on order | (+) | Other. |
| On hand & on order | 5,300 | |
| Reorder point | 6,700 | Calculator. |
| On hand & on order | (−) 5,300 | |
| Reorder difference | 1,400 | |
| Economic Order Quantity | +4,400 | Calculator. |
| Quantity to be Reordered | 5,800 | |

It is seen from the above that the manual operations required by the calculator are simple and easy to execute, all calculations revolving about a central number, the annual usage. By use of the calculator, the inventory reorder problem is reduced to one of simple addition and subtraction.

If the same item were ordered from the United States for destination to South America, the reorder points would be selected from Table II. Otherwise, the calculations are as set forth in the example above. The calculator is generally adaptable to any company's set of reorder variables. When ordering costs and carrying percentages vary, a new K factor can easily be computed and slide 26 referenced to such value.

To those skilled in the art to which this invention pertains, many uses and applications as well as alternate embodiments of the invention will suggest themselves without departing from the spirit and scope of the invention. For example, although the description herein has related primarily to solving the economic reorder quantity problem, it will be understood that a wide variety of problems can be cast in similar form. In fact, any equation of the form $$Q = \frac{K^m U^n}{P^r}$$

where K, U and P are variables and $m$, $n$ and $r$ are constants, can be solved by using the invention set forth herein and modifying the scale cycle length, and spacing according to the values $m$, $n$, $r$, and the rules for constructing nomographs. Thus, the economic order quantity problem becomes a specific case, wherein $m=1$, $n=\frac{1}{2}$, and $r=\frac{1}{2}$. Accordingly, it should be understood that the disclosures and description herein are illustrative of the invention and should not be construed as limiting.

We claim:
1. In a calculator for solving an equation of the form

$$Q = \frac{K^m U^n}{P^r}$$

where K, U and P are variables and $m$, $n$ and $r$ are constants, the combination of a base member including a slide member mounted to the base member for sliding movement thereon, a Q scale disposed on said sliding member, a U scale and P scale disposed on the base member in spaced relation on each side of said sliding member, an isopleth member pivotally and slidably mounted adjacent said U scale, means operatively transferring the values of said U scale to the pivot point of said isopleth member, the line of travel of the pivot point of said isopleth member and said P scale being spaced and oriented with respect to said Q scale to form a nomograph therewith, and a K scale disposed adjacent said slide member and oriented with respect to the Q scale thereon to perform a multiplication with respect thereto, each of said K, U and P scales being proportioned according to the value of the constants $m$, $n$ and $r$, respectively.

2. A calculator as in claim 1 in which $U^n$ takes the form $$\left(\frac{u}{x} \cdot x\right)^n$$

where $u/x$ and $x$ are variables and in which the calculator includes a second slide member positioned adjacent said $U^n$ scale, a $u/x$ scale disposed on said second slide member, and an $x$ scale disposed on the base member adjacent said slide member, a reference mark disposed on said second slide member for aligning the $u/x$ scales to the desired value of $x$, and the cursor member having a hairline thereon crossing the $u/x$ scale and the $U^n$ scale, said U scale and $u/x$ scale and $x$ scale being oriented with respect to each other so that when the marker is set adjacent the $x$ on the $x$ scale and the hairline to $u/x$ on the $u/x$ scale, the hairline also crosses the U scale at the correct value of U.

3. A calculator as in claim 2 in which the cursor and isopleth member are mounted together for sliding movement with respect to the base member, the hairline on said cursor crossing the pivot point of the isopleth member so that a calculation of U automatically positions the isopleth member at the correct point of the U scale.

4. A calculator as in claim 3 in which the $x$ scale is divided into a plurality of scales representing different ranges and in which a separate marker and hairline is provided for each $x$ scale, said markers and hairlines being arranged so that the correct value of U is indicated by that hairline intersecting the pivot point of the isopleth member.

5. A calculator as in claim 4 in which Q is the economic order quantity, U is the annual usage P is the unit price, and in which $n$ equals one-half and $r$ equals one-half, and further in which said $x$ scales are two in number, one ranging from one to four weeks and the other ranging from one to twelve months.

6. In a calculator, a base member, a slide member slidably mounted to said base member, an isopleth member, means mounting said isopleth member to said slide member for pivotal movement thereon about a pivot point fixed on the slide member, a first scale positioned on the base member alongside said slide member, a cursor fastened to said slide and overlying said first scale so that values indicated by the scale are effectively transferred to the pivot point of said isopleth member, second and third scales disposed on the calculator and oriented with respect to said first scale to form a nomograph therewith and to be crossed by said isopleth member, and a second slide member, said second scale being disposed on said second slide member, and a fourth scale disposed on the base member adjacent said second slide member, said fourth scale being oriented with respect to the second scale on said slide member for performing a multiplication of the values of said second scale by said fourth scale.

7. A calculator as in claim 6 further including a third slide member disposed for sliding movement parallel to and adjacent said first scale, a scale disposed on said third slide corresponding to the first scale, and in which said cursor overlies both said first scale and said third slide.

8. A calculator as in claim 6 in which means pivotally mounting said isopleth member includes a post, a knob secured to the post, the isopleth member being held between the knob and said slide, whereby one end of said isopleth together with the slide may be moved together with respect to the base member.

9. In a calculator for finding economic order quantities, a base member having first and second spaced parallel slots formed thereon, first and second slide members disposed in the respective slots, an isopleth member, means mounting said isopleth member to said first slide member for pivotal movement thereon about a pivot point fixed on the member, a first scale representing annual usage values disposed on the base member alongside said first slide member, a cursor fastened to said first slide and overlying said first scale so that values indicated by the scale are effectively transferred to the pivot point of said isopleth member, a second scale representing unit cost and disposed on the base member in spaced parallel relation to said first scale, a third scale representing economic order quantity and disposed on said second slide member adjacent one edge thereof, said second slide member and second slot disposed intermediate the first and the second scales, said isopleth constructed and arranged to overlie said second and third scales, a fourth scale representing K values disposed on the base member adjacent the edge of said first slide member and abutting said third scale, said fourth scale oriented for cooperating with said third scale for multiplying the reading of such scale with respect to said isopleth.

10. A calculator as in claim 9 further including a fifth scale representing unit costs disposed on said base member and arranged to be read along the same reference line as said second scale, and a sixth scale representing ABC control steps arranged to be read along the same reference line as said third scale, the steps being scaled so that said sixth scale is read by the intersection of the isopleth thereon and across the third scale.

References Cited
UNITED STATES PATENTS

| | | | |
|---|---|---|---|
| 1,667,812 | 5/1928 | Miller | 235—61 |
| 2,832,539 | 4/1958 | Blakeley et al. | 235—70 |
| 3,083,905 | 4/1963 | Schweihs | 235—70 |

RICHARD B. WILKINSON, *Primary Examiner.*

S. J. TOMSKY, *Examiner.*

L. R. FRANKLIN, *Assistant Examiner.*